United States Patent
Reich et al.

(10) Patent No.: US 9,726,225 B2
(45) Date of Patent: Aug. 8, 2017

(54) DISTRIBUTED LOAD BEARING WITH AN OUTER FLEX RING

(71) Applicant: DEERE & COMPANY, Moline, IL (US)

(72) Inventors: Steven A Reich, Washoe Valley, NV (US); Matthew J Graeser, Aiken, SC (US); Dale J Swehla, Waterloo, IA (US); Micheal A Langner, Waterloo, IA (US)

(73) Assignee: DEERE & COMPANY, Moline, IL (US)

( * ) Notice: Subject to any disclaimer, the term of this patent is extended or adjusted under 35 U.S.C. 154(b) by 47 days.

(21) Appl. No.: 14/925,310

(22) Filed: Oct. 28, 2015

(65) Prior Publication Data

US 2017/0122376 A1     May 4, 2017

(51) Int. Cl.
| | |
|---|---|
| *F16C 7/04* | (2006.01) |
| *F16C 41/02* | (2006.01) |
| *F16C 9/06* | (2006.01) |
| *F16C 19/26* | (2006.01) |
| *F16C 7/02* | (2006.01) |

(52) U.S. Cl.
CPC .............. F16C 41/02 (2013.01); F16C 7/023 (2013.01); F16C 9/06 (2013.01); F16C 19/26 (2013.01); *F16C 2360/22* (2013.01)

(58) Field of Classification Search
CPC .... F16C 7/023; F16C 9/02; F16C 9/03; F16C 9/04; F16C 9/06; F16C 19/26; F16C 19/522; F16C 25/06; F16C 27/04; F16C 27/066; F16C 41/02; F16C 2360/22
See application file for complete search history.

(56) References Cited

U.S. PATENT DOCUMENTS 1,512,328 A * 10/1924 Bell .......................... F16C 9/06
                                                                                             384/216
2,248,323 A * 7/1941 Anthony ................. F16C 7/023
                                                                                             123/78 E (Continued)

FOREIGN PATENT DOCUMENTS

| DE | 1292452 B * | 4/1969 | ............... F16C 19/46 |
| DE | 19925000 A1 * | 12/2000 | ................ F16C 9/06 |

(Continued)

OTHER PUBLICATIONS

Machine translation of DE 19925000 A1 obtained on Dec. 15, 2016.*

(Continued)

*Primary Examiner* — Adam D Rogers (57) ABSTRACT

A distributed load bearing including an outer flex ring, a load distribution spring, and a retainer. The outer flex ring is configured to be positioned radially outwards of a shaft. The load distribution spring is preloaded and positioned radially outwards of the outer flex ring. A radially inner surface of the load distribution spring contacts the outer flex ring. The radially inner surface is an arc defined by a first radius when the load distribution spring is in a lower load distribution mode, and a second radius when the load distribution spring is in a higher load distribution mode. The retainer is positioned radially outwards of the load distribution spring, and the retainer angularly and radially positions the load distribution spring.

18 Claims, 8 Drawing Sheets

(56) References Cited

U.S. PATENT DOCUMENTS

| | | | |
|---|---|---|---|
| 2,738,241 A | | 3/1956 | Von Mohrenstein |
| 5,247,855 A * | | 9/1993 | Alten .................... F16C 35/067 |
| | | | 384/536 |
| 7,431,504 B1 * | | 10/2008 | Pelfrey ................. F01D 25/164 |
| | | | 384/535 |
| 8,182,153 B2 * | | 5/2012 | Singh .................... F01D 25/164 |
| | | | 384/477 |
| 2005/0145060 A1 * | | 7/2005 | Weaver ................. F01M 11/02 |
| | | | 74/593 |
| 2011/0194794 A1 * | | 8/2011 | Joki ......................... F16C 9/02 |
| | | | 384/457 |
| 2013/0142470 A1 | | 6/2013 | Yoo et al. |

FOREIGN PATENT DOCUMENTS

| | | | | |
|---|---|---|---|---|
| DE | 10230428 A1 * | 1/2004 | ............ | F02B 75/045 |
| DE | 102013215837 A1 | 2/2015 | | |
| FR | 1338123 A * | 9/1963 | ............. | F16C 33/58 |
| FR | 1353660 A * | 2/1964 | ............. | F16C 17/03 |
| GB | 542372 A | 1/1942 | | |
| JP | S567119 U | 1/1981 | | |

OTHER PUBLICATIONS

Machine translation of DE 1292452 B obtained on Dec. 15, 2016.*
European Search Report in foreign counterpart application 16193782.6 dated Mar. 28, 2017 (8 pages).

* cited by examiner

DISTRIBUTED LOAD BEARING WITH AN OUTER FLEX RING

FIELD OF THE DISCLOSURE

The present disclosure relates to a distributed load bearing with an outer flex ring.

BACKGROUND OF THE DISCLOSURE

Diesel engines use a much leaner air-to-fuel ratio than gasoline engines. The larger amount of air in the intake gas promotes more complete fuel combustion and better fuel efficiency, and thus lower emissions of hydrocarbons and carbon monoxide than gasoline engines. However, with the higher pressures and temperatures in the diesel engine, nitrogen oxides emissions, which include nitrogen oxide (NO) and nitrogen dioxide ($NO_2$), known collectively as $NO_x$, tend to be higher because high combustion temperatures cause the oxygen and nitrogen in the intake air to combine.

To comply with increasingly stringent government mandates regarding $NO_x$ emissions, engine manufacturers have developed several $NO_x$ reduction approaches. One such approach is exhaust gas recirculation (EGR), in which a percentage of the exhaust gas is drawn or forced back into the intake and mixed with the fresh intake gas and fuel that enters the combustion chamber. Another approach is selective catalytic reduction (SCR). The SCR process reduces $NO_x$ to diatomic nitrogen ($N_2$) and water ($H_2O$) using a catalyst and anhydrous ammonia ($NH_3$) or aqueous $NH_3$, or a precursor that is convertible to $NH_3$, such as urea.

In addition to $NO_x$ emissions, diesel engines also produce particulate matter (PM), or soot, which is produced in comparatively larger amounts than that of gasoline engines. PM is a complex emission that includes elemental carbon, heavy hydrocarbons derived from the fuel, lubricating oil, and hydrated sulfuric acid derived from the fuel sulfur. One approach for reducing or removing PM in diesel exhaust is a diesel particle filter (DPF). The DPF is designed to collect PM while simultaneously allowing exhaust gases to pass therethrough.

These example approaches as well as others may result in, or require, cylinder pressures that are relatively high, as compared to cylinder pressures in systems not using such approaches. These higher cylinder pressures create higher forces, and these higher forces are then applied to the intake and exhaust valves, the pistons, the connecting rods, and the crankshaft. Such forces may result in failures to these and other components in the engine.

SUMMARY OF THE DISCLOSURE

Disclosed is a distributed load bearing having an outer flex ring, a load distribution spring, and a retainer. The flex ring is configured to be positioned radially outwards of a shaft, and the spring is preloaded and positioned radially outwards of the flex ring. A radially inner surface of the spring is in contact with the flex ring. The radially inner surface of the spring is an arc with a first radius when the spring is in a lower load distribution mode, and a second radius when the spring is in a higher load distribution mode. A retainer is positioned radially outwards of the spring, and it angularly and radially positions the spring.

During the higher load distribution mode, most or all rollers of the bearing that are directly and radially inwards of the spring, at a given moment, may carry substantial loads. By sharing the loads, the bearing may not require as much oil, may require a lower viscosity oil, and/or may be able to handle higher loads than would otherwise be the case.

Incorporating rollers (e.g., needle rollers) and a load distribution spring may provide several advantages over journal bearings. Bearings with rollers may have a substantially lower running friction than journal bearings, and they may enable the use of lighter viscosity oils. Further, they may require only a relatively low volume of oil, as the predominate motion at the contact points is rolling motion, instead of sliding motion. The low volume of oil may result in reduced oil pump power losses and reduced windage losses, based on less oil flowing through the crankcase and impeding the rotation of the crankshaft. By incorporating rollers, a given engine's efficiency may be improved, based on the reduced friction and the lower oil volume requirements.

Additionally, bearings with rollers (e.g., needle rollers) and a load distribution spring may be a lower cost alternative than journal bearings, given that many of them require higher cost alloys or diamond like coatings (DLC). By utilizing bearings with rollers, manufacturers may leverage high volume production methods and materials developed by the leading bearing manufacturing, thereby reducing costs.

BRIEF DESCRIPTION OF THE DRAWINGS

The detailed description of the drawings refers to the accompanying figures in which.

Like reference numerals in the various drawings indicate like elements.

DETAILED DESCRIPTION OF THE DRAWINGS

Figure 1:
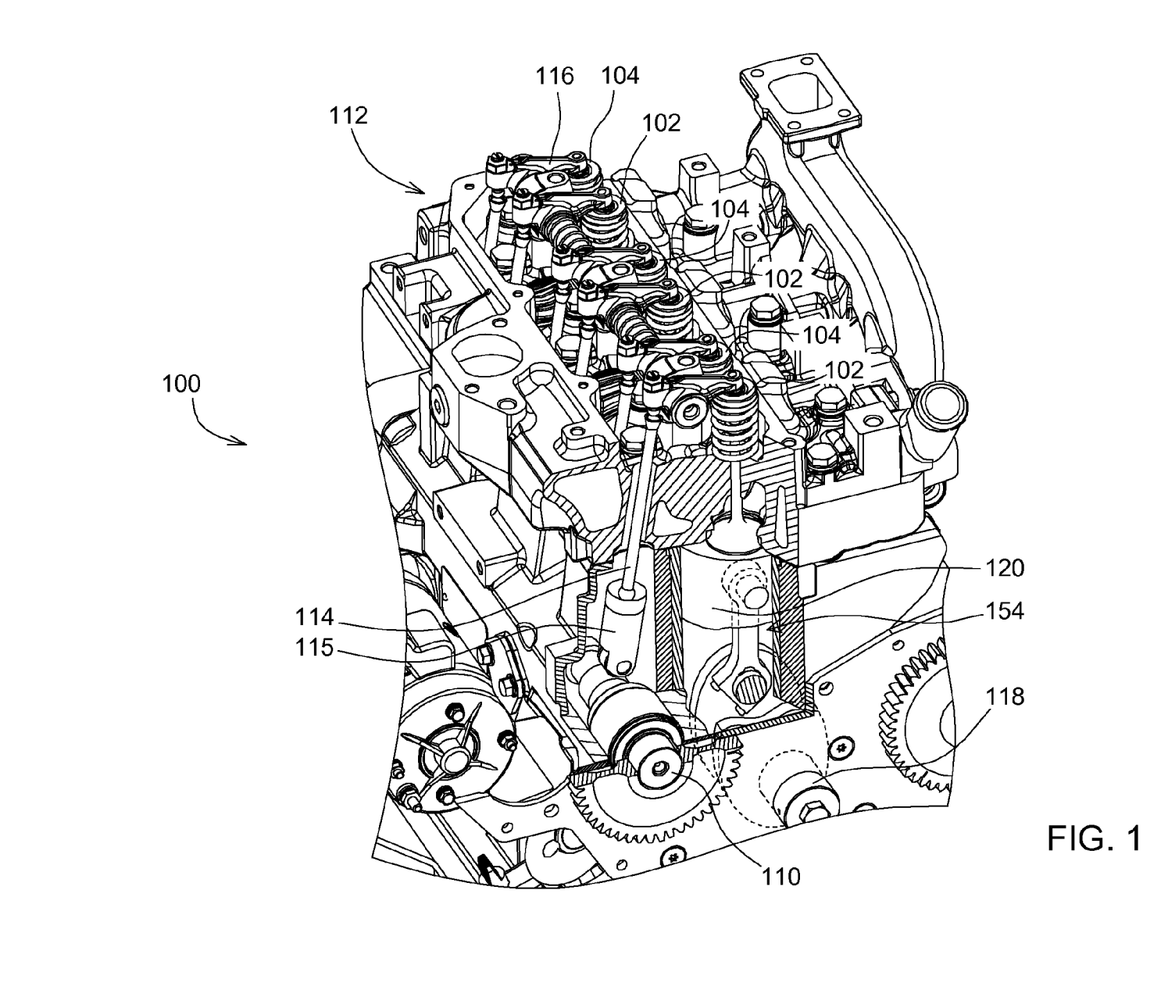
FIG. 1 is a perspective view of an engine, with certain portions broken away, having a valvetrain and a connecting rod.

Referring to FIG. 1, there is shown a perspective view of an engine 100 that could be used for providing power to a variety of machines, including trucks, automobiles, marine vessels, stationary generators, construction machines, agricultural machines, and recreational vehicles. The engine 100 may be an internal combustion gasoline or diesel engine, and may be of any size, have any number cylinders, and be of any configuration. The engine 100 is shown with only one intake and exhaust valve 102, 104 in fluid communication with each cylinder, but in other embodiments, it may have multiple valves.

A connecting rod 154 transmits the motion of a piston 120 to a crankshaft 118, and the crankshaft 118 provides rotary output power (i.e., the engine power). The connecting rod 154 may include a shank 122 with a small eye 124 on one end and a large head 126 at the other, the small eye 124 forming a bearing for a piston pin, and the head forming a bearing for the crankshaft 118. The head of the connecting rod 154 may be split into a shank body 127 and a cap 128 mounted thereto with a pair of fasteners 130.

The engine 100 receives intake gas and dispels exhaust gas at precise intervals using a valvetrain 112 and a camshaft 110. Push rods 114 may be used for providing motion of the camshaft 110 to rockers 116. Each push rod 114 may be a hollow steel pipe with solid steel ends, the lower end of it being formed into a half-round head to match a spherical seat in a follower 115, and the upper end being a spherical socket to match an adjusting screw of the rocker 116. When the push rods 114 move up, the mating rocker 116 is moved down, so as to contact a valve stem tip of the respective intake or exhaust valve 102, 104.

Though not illustrated, an exhaust system of the engine 100 may include an aftertreatment system for reducing PM and $NO_x$. It may include an oxidation catalyst, a DPF for reducing the PM, and an SCR catalyst for removing the $NO_x$. A reductant (e.g., diesel exhaust fluid) may be injected into the exhaust downstream of the DPF, but upstream of the SCR catalyst. Some examples of the engine 100 may also include an EGR system that reroutes a portion of the exhaust gas and mixes it with a fresh intake gas, so as to form a mixed intake gas that is combusted in the engine 100. The EGR system may lower combustion temperatures and $NO_x$ levels.

Referring to FIGS. 2-6, an embodiment of a distributed load bearing 134 is shown is use with a connecting rod 154. It includes an outer flex ring 136, a load distribution spring 138, and a retainer 140. The flex ring 136 is configured to be positioned radially outwards of a shaft. The shaft in the illustrated embodiment is a crankshaft 118, but it could be any kind of shaft that a bearing could be mounted to. The flex ring 136 may include a first semicircular portion 143a and a second semicircular portion 143b, the semicircular portions 143a, 143b being separate so that they can be installed around the crankshaft 118. Each of semicircular portions 143a, 143b may include a radially outer tab 151, 153, the tabs 151, 153 being used to angularly fix the flex ring 136 relative to the connecting rod 154.

Figure 5:
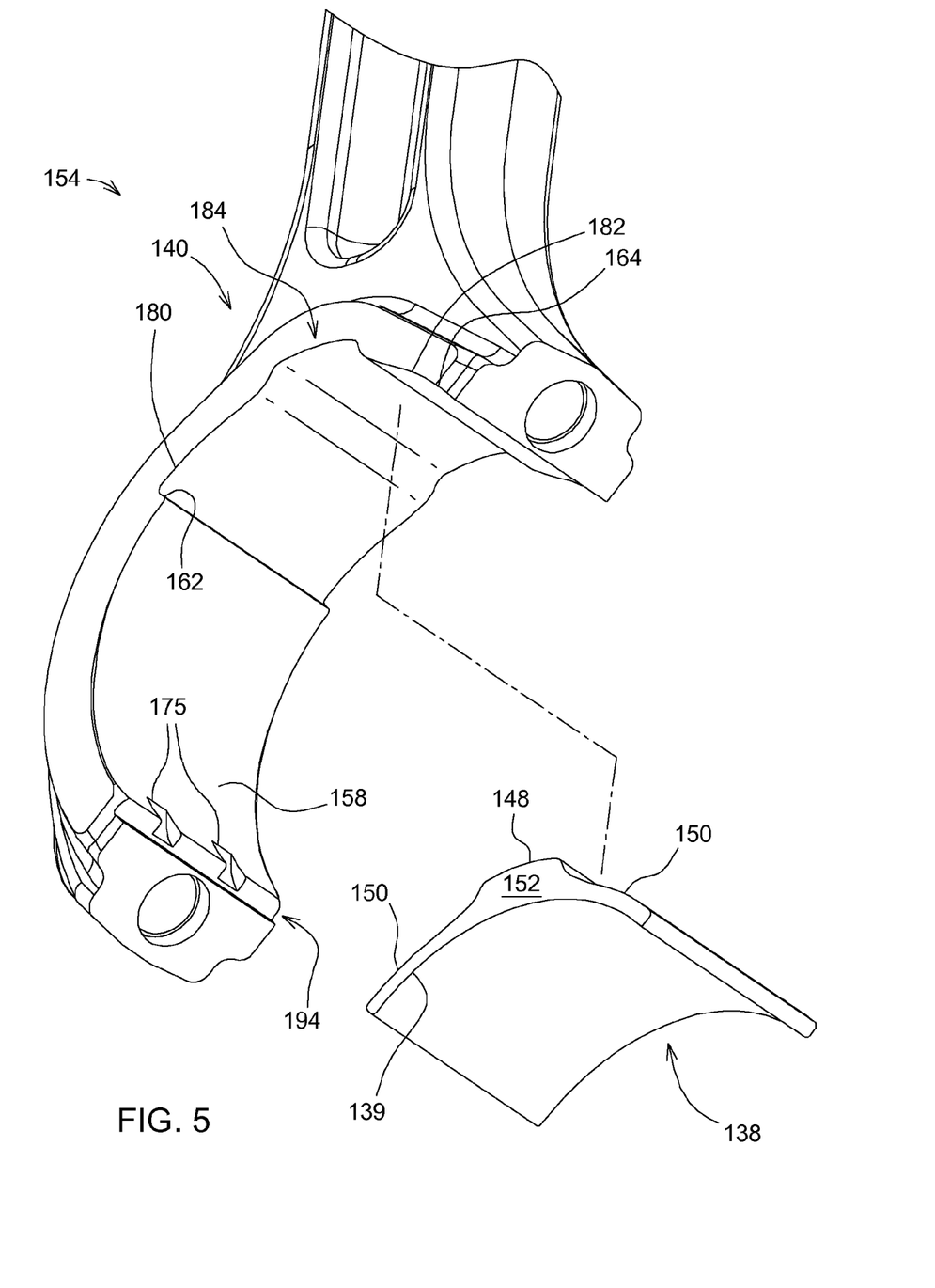
FIG. 5 is an exploded perspective view of the connecting rod and the distributed load bearing.
Figure 6:
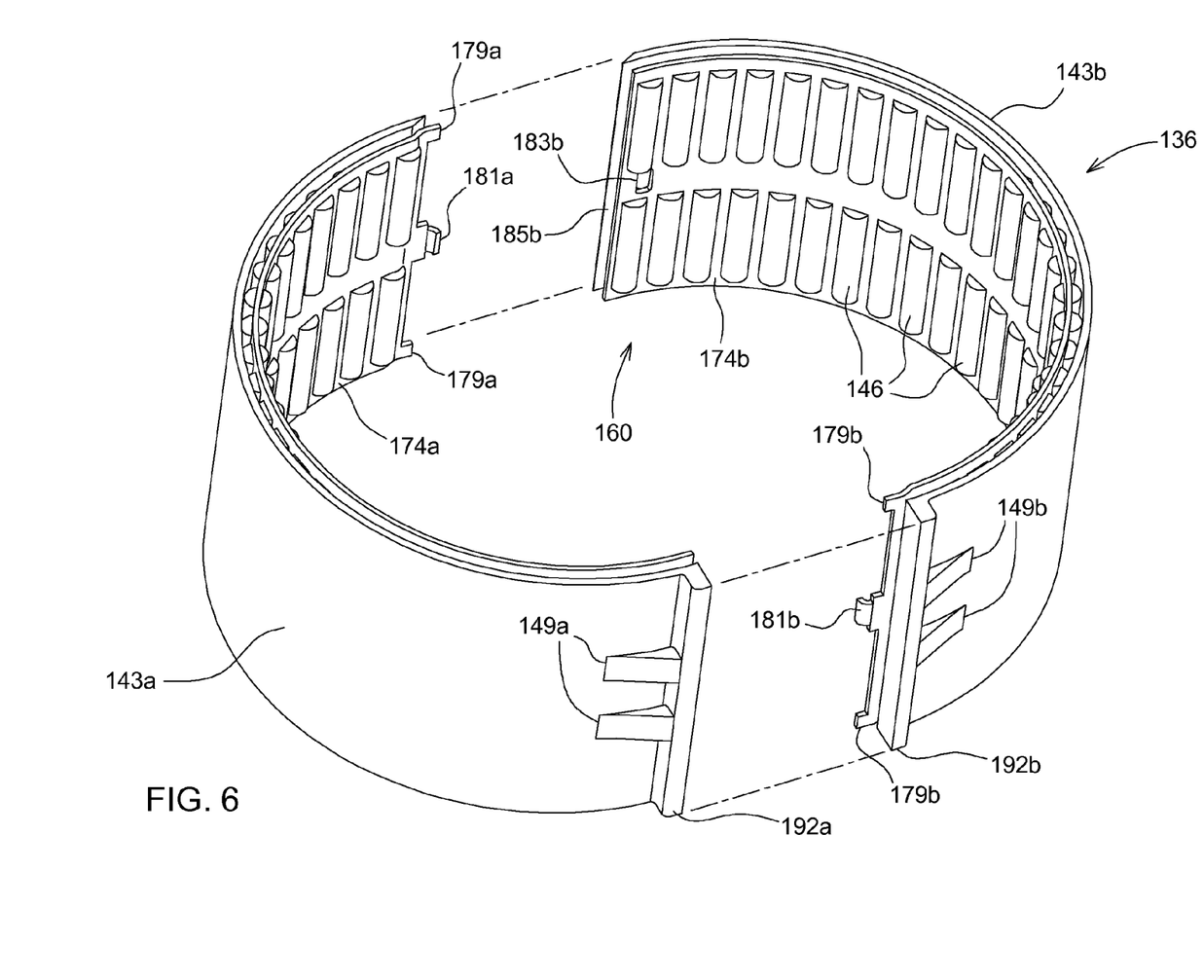
FIG. 6 is a partially exploded perspective view of a cage and rollers of the distributed load bearings.

As shown in FIGS. 5-6, each of the semicircular portions 143a, 143b may include respective lateral locking tabs 149a, 149b and angular locking tabs 192a, 192b. The lateral locking tabs 149a, 149b may engage with lateral locking receivers of the connecting rod 154, so as to prevent fore-aft-movement of the semicircular portions 143a, 143b relative thereto. An example of one pair of lateral locking tab receivers 175 is shown in FIG. 5. The angular locking tabs 192a, 192b may engage with an angular locking receiver 194 of the connecting rod 154, so as to prevent angular movement of the first and semicircular portions 143a, 143b relative thereto. On the ends opposite of the angular locking tabs 192a, 192b, the semicircular portions 143a, 143b may contact one another via, for example, a canted splice.

Figure 2:
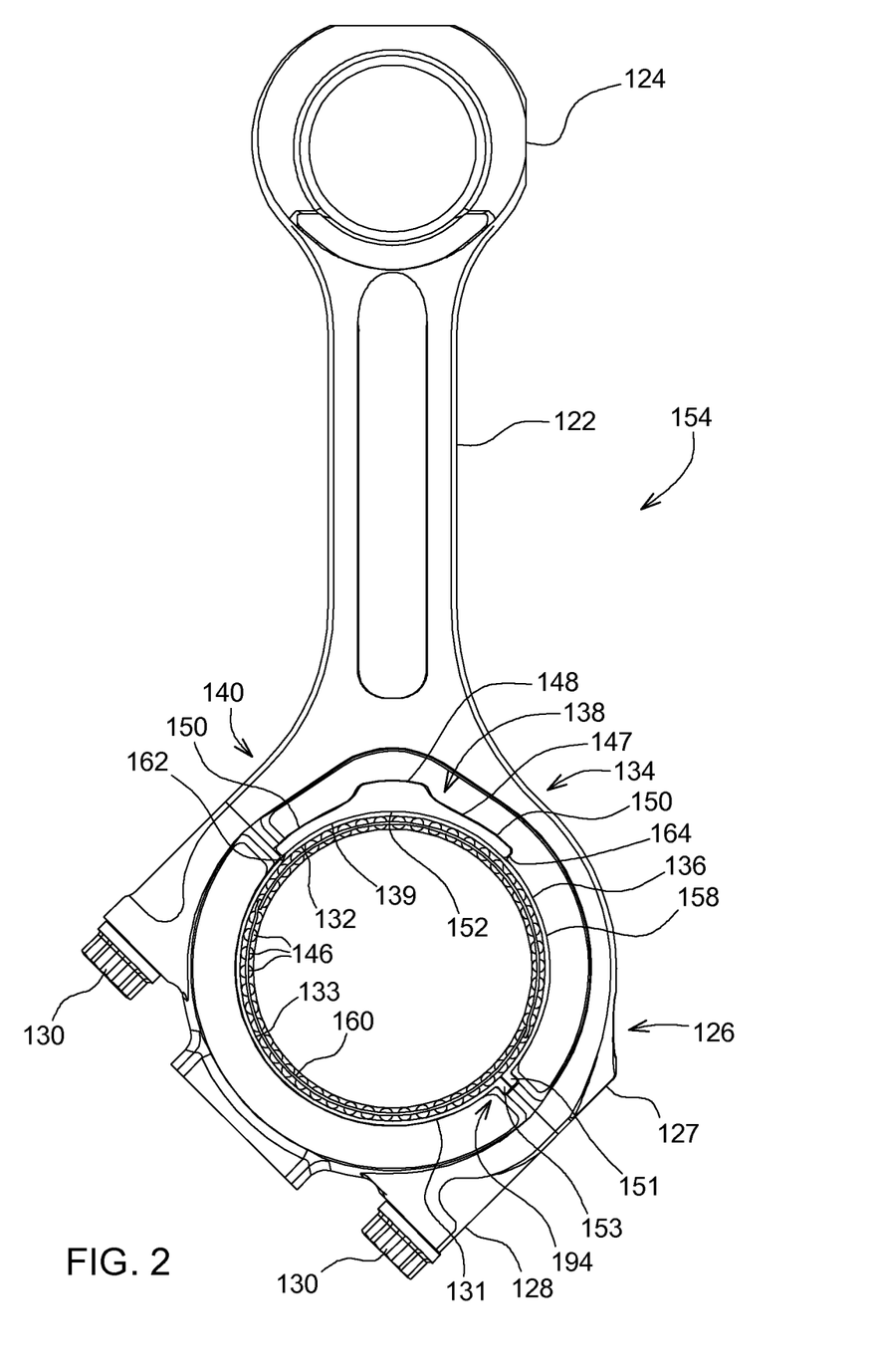
FIG. 2 is an elevational view of a side of a connecting rod and a distributed load bearing.
Figure 3:
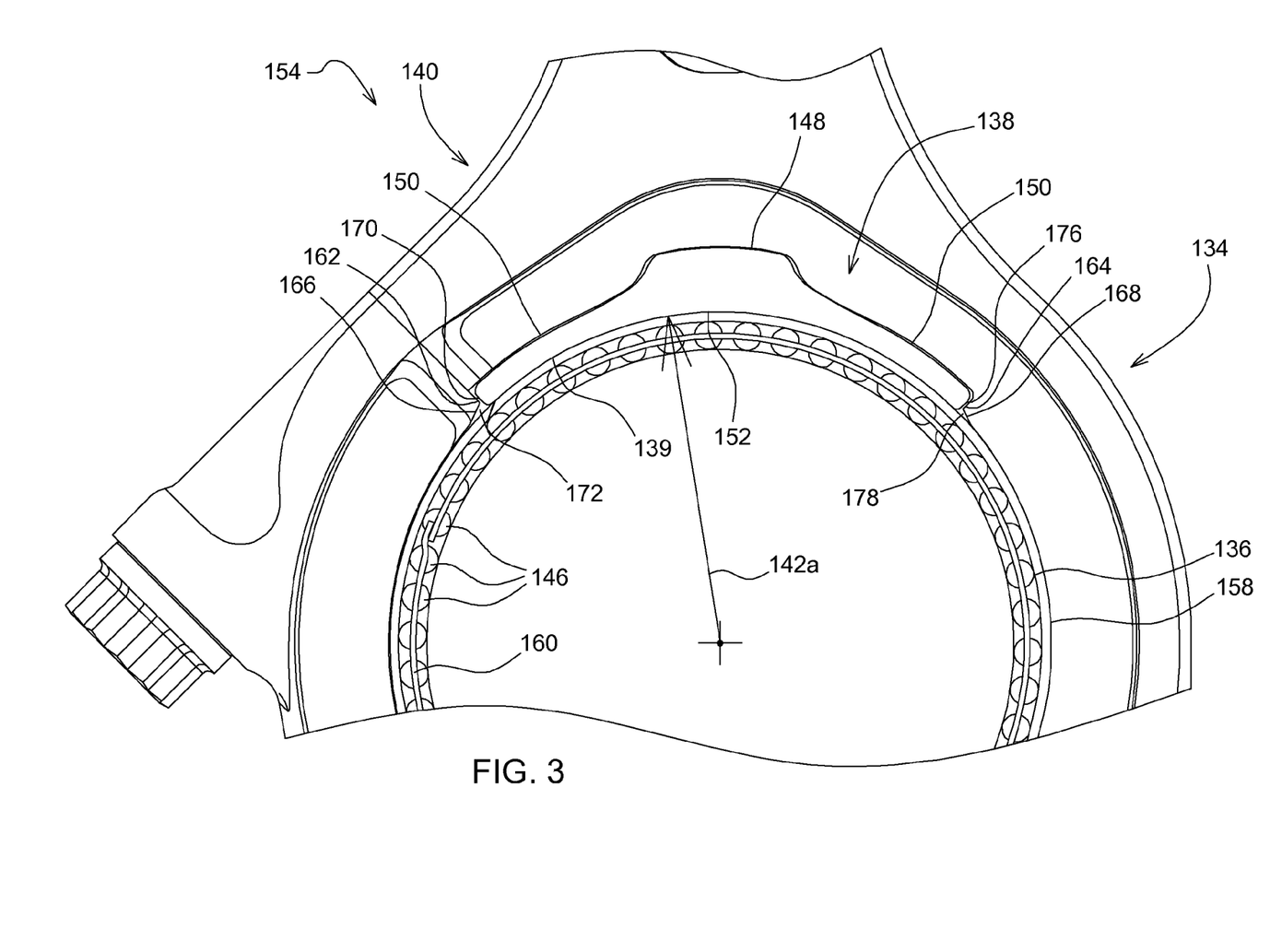
FIG. 3 is an enlarged elevational view of the distributed load bearing being shown in a lower load distribution mode.
Figure 4:
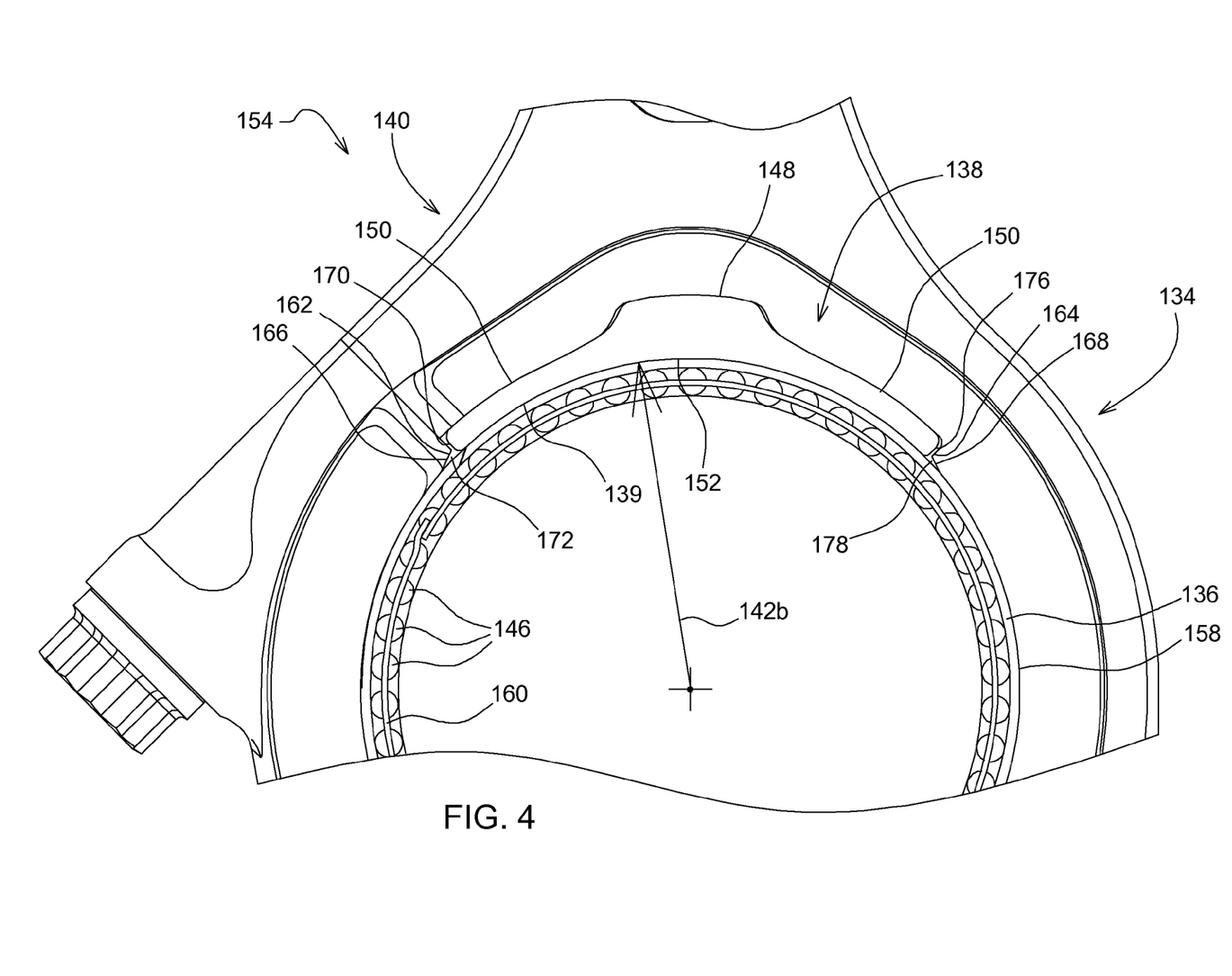
FIG. 4 is an enlarged elevational view of the distributed load bearing being shown in a higher load distribution mode.

As shown in FIGS. 2-4, the spring 138 is preloaded and positioned radially outwards of the flex ring 136. A radially inner surface 139 of the spring 138 contacts the flex ring 136. The radially inner surface 139 is defined by a first radius 142a when the spring 138 is in a lower load distribution mode (see FIG. 3), and a second radius 142b when the spring 138 is in a higher load distribution mode (see FIG. 4). The first radius 142a may be smaller than the second radius 142b. In the lower load mode, for example, when there is not a combustion event occurring in the respective combustion chamber, the first radius 142a is smaller because the spring 138 is either in its natural shape or coiled slightly.

In contrast, in the higher load mode, when there is a combustion event, the second radius 142b is bigger because the spring 138 is either slightly flattened or uncoiled. The second radius 142b may depend partially on the clearance that the spring 138 has to flatten or uncoil with respect to a retainer 140. The spring 138 may be a single piece of material made from, for example, SAE 1078 steel, and it may be heat treated and/or polished. The illustrated spring 138 spans an angular distance of approximately 90°, but other embodiments may span a different distance.

As illustrated, the retainer 140 may be a part of (i.e., defined by) the connecting rod 154 and be positioned radially outwards of the spring 138. In this embodiment, the flex ring 136 deflects relative to the connecting rod 154 during transitions back-and-forth between the lower and higher load modes.

The spring 138 may apply a radially inward force to the flex ring 136 and a radially outward force to the retainer 140. The flex ring 136 may be a circular shape during the lower load mode. But in contrast, the radially inward force may cause the flex ring 136 to deflect asymmetrically relative to a circular shape (i.e., be noncircular), particularly during the higher load mode, such as during a combustion event. For example, in the higher load mode, some portions of the flex ring 136 may deflect radially inward and some portions, radially outward. In the illustrated embodiment, the portions deflecting radially inward may be positioned angularly between the portions deflecting radially outward. The portions deflecting radially inward may be, for example, in alignment with the forces associated with a combustion event in a respective cylinder of the engine 100.

The load bearing 134 may include a cage 160 and a plurality of rollers 146 positioned radially inwards of the flex ring 136, and the rollers 146 may rotate around it. The rollers 146 may be balls, or cylindrical rollers, or needles, just to name a few examples. The cage 160 may include a first semicircular cage 174a and a second semicircular cage 174b, the semicircular cages 174a, 174b being separate so that they can be installed around the crankshaft 118.

The semicircular cages 174a, 174b may include respective overlapping tabs 179a, 179b, retaining hooks 181a, 181b, and hook receivers (e.g., hook receiver 183b). During installation, the retaining hooks 181a, 181b may snap into their respective hook receivers, so as to keep the semicircular cages 174a, 174b together as one unit (i.e., the cage 160). Some embodiments of the semicircular portions 143a, 143b may include respective installation clearances (e.g., installation clearance 185b for giving the retaining hooks 181a, 181b installation clearances. The overlapping tabs 179a, 179b may further constrain and hold the semicircular cages 174a, 174b together as one unit (i.e., the cage 160).

The spring 138 may load and, as discussed, even deflect the flex ring 136, causing several of the rollers 146 to share the loading. In the illustrated embodiment, for example, during the higher load mode, most or all of the rollers 146 that are directly and radially inwards of the spring 138, at a given moment, carry substantial loads. By sharing the loads over several rollers 146, the load bearing 134 may not require as much oil, may only require a lower viscosity oil, and/or may be able to handle higher loads than would otherwise be the case.

Some embodiments of the spring 138 may include a load distribution hump 148 and a pair of wings 150 extending circumferentially away from opposite sides thereof. The wings 150 may overlap a portion of an outer flex surface 131 of the flex ring 136. The hump 148 may be positioned to apply the radially outward force to the retainer 140, while the wings 150 may be positioned to apply the radially inward force to the flex ring 136.

The spring 138 may include a coupling region 152 that is positioned directly and radially inward from the hump 148, and angularly between the wings 150. The coupling region 152 may also apply a portion of the radially inward force to the flex ring 136.

As shown in FIG. 2, the radially inner surface 139 of the spring 138 may overlap a first portion 132 of an outer flex surface 131 of the flex ring 136, and a discontinuous inner circumferential surface 158 of the connecting rod 154 may overlap, but be radially displaced from, a second portion 133 of the outer flex surface 131. As illustrated, the portions 132, 133 may be equivalent to an entirety of the outer flex surface 131. The retainer 140 main include a radially outer surface 147 positioned radially outward relative to the discontinuous surface 158, and coupled to first and second ends 162, 164 thereof. Initially, a continuous, circular surface with a given diameter may be machined into the connecting rod 154, and the radially outer surface 147 may then be machined, thus creating not only itself, but also the discontinuity in the discontinuous surface 158.

Though not shown in the illustrated embodiment, the wings 150 may each include a wing hump positioned, for example, perpendicularly relative to the hump 148. The wing humps may fit into receiving humps formed into the radially outer surface 147, and may be included for preventing fore-and-aft movement of the spring 138 relative to the connecting rod 154.

As shown in FIG. 3, the outer flex surface 131 of the flex ring 136, the first radially outward taper 166, and a first tip 170 of the spring 138 may define a first clearance gap 172. And similarly, the outer flex surface 131 of the flex ring 136, the second radially outward taper 168, and a second tip 176 of the spring 138 may define a second clearance gap 178. As shown in FIG. 4, during the higher load mode, for example, some portions of the flex ring 136 may flex radially outward and fill in the first and second clearance gaps 172, 178.

As illustrated in FIGS. 2-5, the radially outer surface 147 may include a first L-shaped segment 180 coupled to the first end 162, a second L-shaped segment 182 coupled to the second end 164, and a retaining hump 184 coupled to L-shaped segments 180, 182. The retaining hump 184 may be positioned radially outwards and angularly between the L-shaped segments 180, 182. Further, the retaining hump 184 and the hump 148 may be designed, such that the contact area therebetween increases as the loading on the connecting rod 154 increases and vice-versa. Increasing the contact area at high loads may reduce contact stresses and entrain ambient oil, thereby extending the life of the contact surfaces (i.e., the retaining hump 184 and the hump 148). The first wing 150 may be in periodic contact with the first I-shaped segment 180, and similarly the second wing 150 may be in periodic contact with the second I-shaped segment 182. For example, both wings 150 may be in contact with their respective I-shaped segments 180, 182 during the higher load modes.

Figure 7:
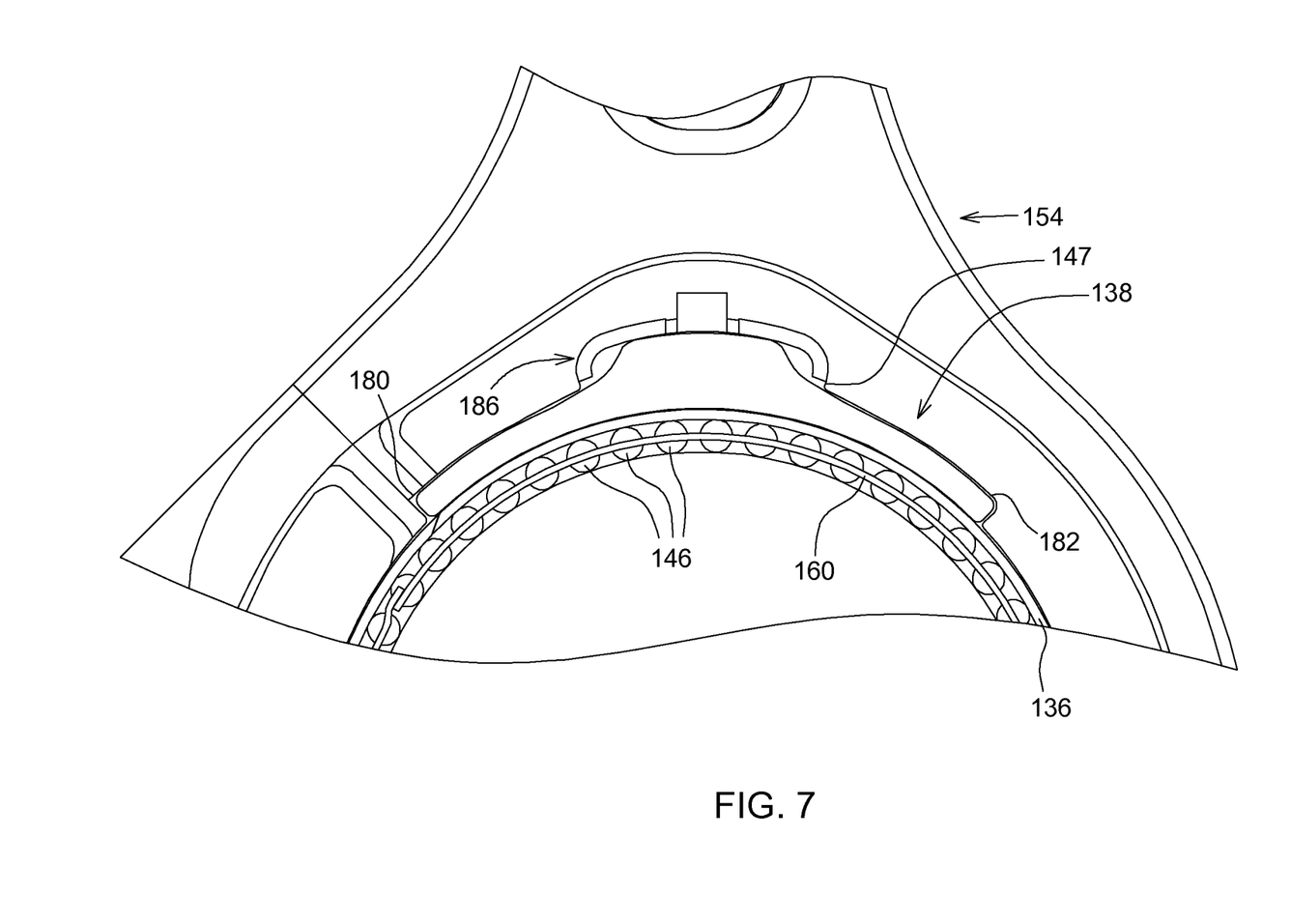
FIG. 7 is an enlarged elevational view of an example of a distributed load bearing having a wear pad.
Figure 8:
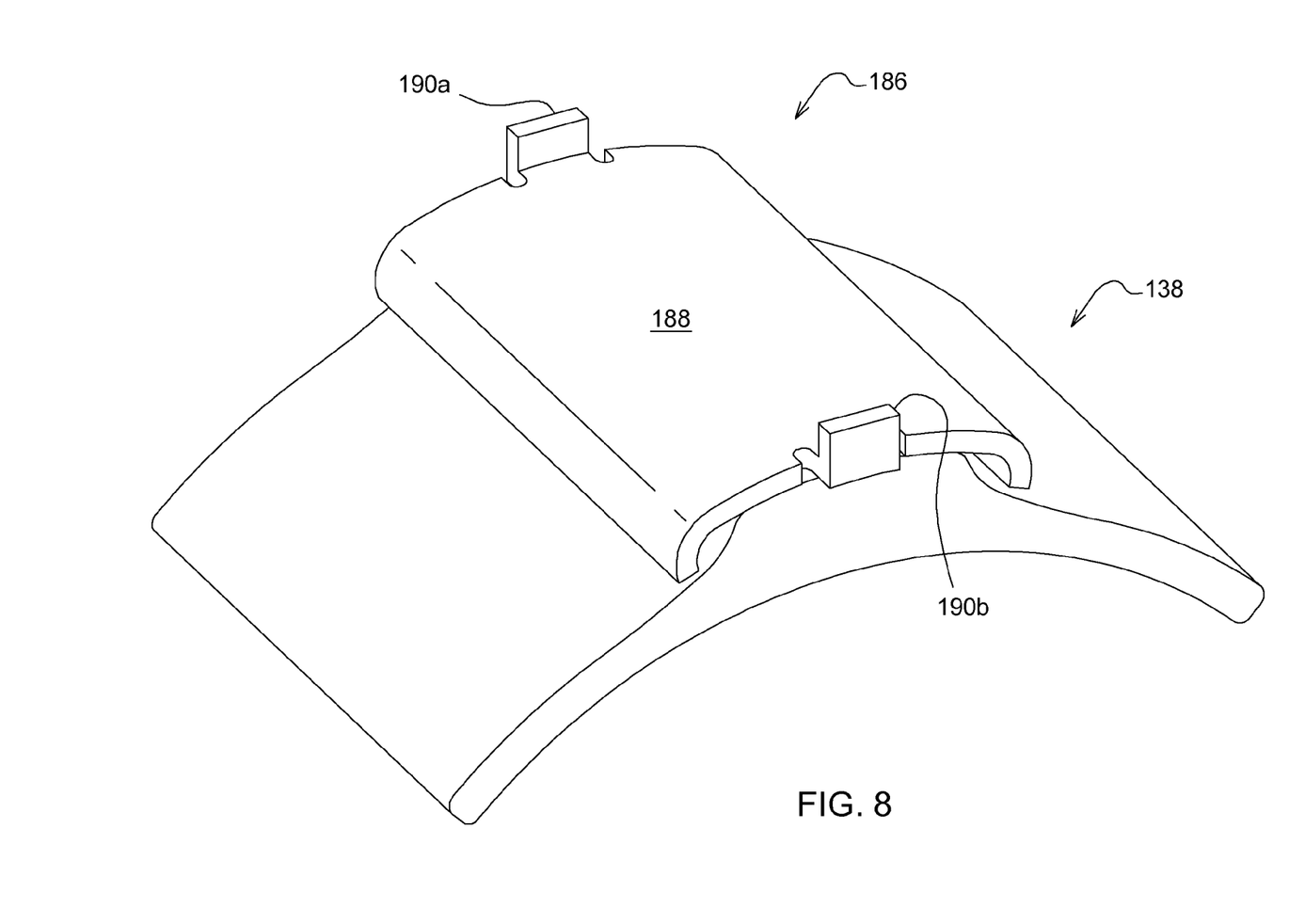
FIG. 8 is an enlarged perspective view of the wear pad and a load distribution spring.

Referring to FIGS. 7-8, there is shown an example of the load bearing 134 having a wear pad 186. In such an embodiment, the wear pad 186 is sandwiched between, and in contact with, the radially outer surface 147 and the spring 138. The wear pad 186 may be manufactured from low carbon strip steel, formed to its final shape, and carbonitrided.

The wear pad 186 may include a main body 188, a first tab 190a, and a second tab 190b. The tabs 190a, 190b may extend radially outward relative to the main body 188. The illustrated wear pad 186 is shown as having a radially outer wear surface that follows the contour of the radially outer surface 147 of the connecting rod 154, but other embodiments may take their own unique shapes (e.g., a shape different than the contour of the radially outer surface 147). A width of the main body 188 may be substantially similar to a width of the connecting rod 154.

The first tab 190a may be positioned on a first side of the main body 188 and in contact with a first side of the connecting rod 154, while the second tab 190b may be positioned on a second side of the main body 188 and in contact with a second side of the connecting rod 154. The tabs 190a, 190b prevent fore-and-aft movement of the wear pad 186 relative to the connecting rod 154. The tabs 190a, 190b are illustrated as bends formed from the same piece of material as the main body 188, but in other embodiments, the tabs 190a, 190b may be completely separate pieces (e.g., rivets).

While the disclosure has been illustrated and described in detail in the drawings and foregoing description, such illustration and description is to be considered as exemplary and not restrictive in character, it being understood that illustrative embodiments have been shown and described and that all changes and modifications that come within the spirit of the disclosure are desired to be protected. It will be noted that alternative embodiments of the present disclosure may not include all of the features described yet still benefit from at least some of the advantages of such features. Those of ordinary skill in the art may readily devise their own implementations that incorporate one or more of the features of the present disclosure and fall within the spirit and scope of the present invention as defined by the appended claims.

The invention claimed is:

1. A distributed load bearing, comprising:
an outer flex ring configured to be positioned radially outwards of a shaft;
a load distribution spring that is preloaded and positioned radially outwards of the outer flex ring, a radially inner surface of the load distribution spring contacting the outer flex ring, the radially inner surface of the load distribution spring being an arc defined by a first radius when the load distribution spring is in a lower load distribution mode, and the radially inner surface of the load distribution spring being an arc defined by a second radius when the load distribution spring is in a higher load distribution mode; and
a retainer positioned radially outwards of the load distribution spring, the retainer angularly and radially positioning the load distribution spring.

2. The distributed load bearing of claim 1, wherein the first radius is smaller than the second radius.

3. The distributed load bearing of claim 1, wherein:
the load distribution spring applies a radially inward force to the outer flex ring and a radially outward force to the retainer; and
the radially inward force causes the outer flex ring to deflect asymmetrically relative to a circular shape during the higher load distribution mode.

4. The distributed load bearing of claim 1, further comprising a plurality of rollers positioned radially inwards of the outer flex ring, wherein:
the outer flex ring is noncircular during the higher load distribution mode; and the plurality of rollers rotate along a noncircular path around the outer flex ring during the higher load distribution mode.

5. The distributed load bearing of claim 1, wherein:
the outer flex ring is a circular shape during the lower load distribution mode; and
the outer flex ring deflects asymmetrically relative to the circular shape during the higher load distribution mode.

6. The distributed load bearing of claim 1, wherein the load distribution spring comprises:
a load distribution hump positioned so as to apply a radially outward force to the retainer; and
a pair of wings extending circumferentially away from opposite sides of the load distribution hump so as to apply a radially inward force to the outer flex ring, and the pair of wings overlapping a portion of an outer surface of the outer flex ring.

7. The distributed load bearing of claim 6, wherein the load distribution spring comprises a coupling region that is positioned directly and radially inward from the load distribution hump, and the coupling region is positioned angularly between the pair of wings.

8. A connecting rod comprising the retainer of claim 1, wherein the outer flex ring deflects relative to the connecting rod during transitions back-and-forth between the lower and higher load distribution modes.

9. The connecting rod of claim 8, wherein:
the radially inner surface of the load distribution spring overlaps a first portion of an outer surface of the outer flex ring; and
a discontinuous inner circumferential surface of the connecting rod overlaps a second portion of the outer surface of the outer flex ring.

10. The connecting rod of claim 9, wherein the first portion and the second portion overlap an entirety of the outer surface of the outer flex ring.

11. The connecting rod of claim 8, wherein:
the connecting rod comprises a discontinuous inner circumferential surface comprising a first end and a second end;
the retainer comprises a radially outer surface positioned radially outward relative to the discontinuous inner circumferential surface; and
the radially outer surface is coupled to the first and second ends.

12. The connecting rod of claim 11, wherein:
the discontinuous inner circumferential surface comprises a first radially outward taper and a second radially outward taper;
an outer surface of the outer flex ring and the first radially outward taper and a first tip of the load distribution spring define a first clearance gap; and
the outer surface of the outer flex ring and the second radially outward taper and a second tip of the load distribution spring define a second clearance gap.

13. The connecting rod of claim 12, wherein when in the higher load distribution mode, some portions of the outer flex ring deflect radially outward and fill in the first and second clearance gaps.

14. The connecting rod of claim 11, wherein the radially outer surface comprises:
a first L-shaped segment coupled to the first end;
a second L-shaped segment coupled to the second end; and
a retaining hump coupled to the first and second L-shaped segments, the retaining hump being positioned radially outwards and angularly between the first and second L-shaped segments.

15. The connecting rod of claim 14, wherein the load distribution spring comprises:
a load distribution hump positioned so as to contact and apply a radially outward force to the retaining hump; and
a single first wing and a single second wing extending circumferentially outward from opposite sides of the load distribution hump, the single first wing being in periodic contact with the first L-shaped segment, and the single second wing being in periodic contact with the second L-shaped segment.

16. The connecting rod of claim 15, wherein the load distribution spring comprises a coupling region, the coupling region is positioned directly radially inward from the load distribution hump, and the coupling region is positioned angularly between the single first wing and the single second wing.

17. The connecting rod of claim 11, further comprising a wear pad sandwiched between, and contacting, the radially outer surface and the load distribution spring.

18. The connecting rod of claim 17, wherein the wear pad comprises a main body and a first tab and a second tab, the first and second tabs extend radially outward relative to the main body, the first tab is positioned on a first side of the main body and contacts a first side of the connecting rod, the second tab is positioned on a second side of the main body and contacts a second side of the connecting rod, the first and second tabs are configured to prevent fore-and-aft movement of the wear pad relative to the connecting rod.

* * * * *